(12) United States Patent
Yamauchi

(10) Patent No.: US 6,600,791 B1
(45) Date of Patent: Jul. 29, 2003

(54) RECEIVER AND SIGNAL TRANSMISSION SYSTEM

(75) Inventor: Hiroyuki Yamauchi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/434,041

(22) Filed: Nov. 4, 1999

(30) Foreign Application Priority Data

Nov. 6, 1998 (JP) ............................................. 10-316682

(51) Int. Cl.[7] ................................................. H04B 3/00
(52) U.S. Cl. ..................................................... 375/257
(58) Field of Search ........................... 375/257; 326/30, 326/31, 82

(56) References Cited

U.S. PATENT DOCUMENTS

| | | | | |
|---|---|---|---|---|
| 4,039,856 A | * | 8/1977 | Schlig | ........................ 257/31 |
| 4,380,089 A | | 4/1983 | Weir | |
| 4,785,467 A | * | 11/1988 | Yamada | ...................... 359/155 |
| 5,254,883 A | * | 10/1993 | Horowitz et al. | ............. 326/30 |
| 5,483,184 A | | 1/1996 | Kuo | |
| 5,541,535 A | * | 7/1996 | Cao et al. | ...................... 326/83 |
| 5,568,064 A | * | 10/1996 | Beers et al. | ................... 326/30 |
| 5,758,265 A | | 5/1998 | Okanobu | |

FOREIGN PATENT DOCUMENTS

JP          09-064826          3/1997

* cited by examiner

*Primary Examiner*—Don N. Vo
(74) *Attorney, Agent, or Firm*—Snell & Wilmer, LLP

(57) ABSTRACT

A receiver for receiving a signal transmitted from a transmitter via a transmission line of the present invention includes: a current control section for allowing a current to flow into the current control section from the transmission line or flow from the current control section to the transmission line, wherein the current has an amount which varies according to a logical level of the signal and flows in a same direction irrespective of the logical level of the signal; and a determination section for determining the logical level of the signal based on the amount of current which has flowed from the transmission line into the current control section or based on the amount of current which has flowed out from the current control section to the transmission line.

19 Claims, 8 Drawing Sheets

"0" Transmission

"1" Transmission

"0" Transmission

"1" Transmission

RECEIVER AND SIGNAL TRANSMISSION SYSTEM

BACKGROUND OF THE INVENTION

1. Field of the Invention

The present invention relates to a receiver for receiving a signal transmitted from a transmitter via a transmission line, and a signal transmission system for transmitting a signal via a transmission line.

2. Description of the Related Art

In a conventional signal transmission system, a terminal resistor is connected to one end or both ends of a transmission line. The resistance value of the terminal resistor is set to about 50 ohms so as to match with the impedance of the transmission line (about 50 ohms). In such a signal transmission system, the value of a signal being transmitted (i.e., "0" or "1") is determined by the direction or the current value of the current flowing through the terminal resistor.

For example, consider a case where a 1.5 V terminal power supply and a transmission line are connected to each other via a terminal resistor having a resistance of 50 ohms. In such a case, when a current flows into the transmission line from a driver of a 3.0 V power supply voltage, the transmission line has a potential ("H" potential) which is higher than the 1.5 V terminal power supply by a voltage increase. The voltage increase is determined based on the current flowing into the 1.5 V terminal power supply and on the terminal resistance of 50 ohms. The H potential represents a transmitted signal having a value "1", for example.

Conversely, when the driver draws a current from the 1.5 V terminal power supply toward a point at the terminal potential, the transmission line has a potential ("L" potential) which is lower than the 1.5 V terminal power supply by a voltage decrease. The voltage decrease is determined based on the current flowing out of the 1.5 V terminal power supply and the terminal resistance of 50 ohms. The L potential represents a transmitted signal having a value "0", for example.

In such a conventional signal transmission system, a change in current of 10 mA is required for obtaining a change in signal on the transmission line of 500 mV.

The above-described conventional signal transmission system has the following disadvantages: 1) the change in signal on the transmission line is determined by the voltage decrease (or the voltage increase) which is caused by the terminal resistor. Therefore, in order to increase the change in signal on the transmission line, it is necessary to increase the amount by which the voltage is decreased (or the amount by which the voltage is increased) which is caused by the terminal resistor; and 2) the resistance value of the terminal resistor is determined so as to match with the impedance of the transmission line. Therefore, the resistance value of the terminal resistor cannot be increased to increase the change in signal on the transmission line.

Due to the disadvantages 1) and 2), the only way to increase the change in signal on the transmission line is to increase the change in the current flowing through the transmission line. In order to increase the change in the current flowing through the transmission line, the conventional signal transmission system determines the value of the transmitted signal by switching the direction of the current flow along the transmission line or by switching between conducting a current through the transmission line and conducting no current therethrough.

However, such a large change in the current flowing through the transmission line may disturb the waveform of the transmitted signal. This is because the transmitted signal may be influenced by an induced potential ($dV=-L*dI/dT$), which is determined by the product of the inductance value (L) of the transmission line and the rate of change per unit of time (dI/dT) in the current flowing through the transmission line.

Such a large change in the current flowing through the transmission line may disturb the waveform of the transmitted signal also in a differential type signal transmission system in which two transmission lines are short circuitted via a resistor.

SUMMARY OF THE INVENTION

According to one aspect of this invention, a receiver for receiving a signal transmitted from a transmitter via a transmission line includes: a current control section for allowing a current to flow into the current control section from the transmission line or flow from the current control section to the transmission line, wherein the current has an amount which varies according to a logical level of the signal and flows in a same direction irrespective of the. logical level of the signal; and a determination section for determining the logical level of the signal based on the amount of current which has flowed from the transmission line into the current control section or based on the amount of current which has flowed out from the current control section to the transmission line.

In one embodiment of the invention, the current control section includes: a constant current supply section for supplying a constant current; and a difference current compensation section for compensating for a difference current having an amount which represents a difference between the amount of current which has flowed in from or flowed out to the transmission line and an amount of the constant current.

In one embodiment of the invention, the determination section determines the logical level of the signal based on a direction in which the difference current flows.

In one embodiment of the invention, the logical level of the signal "0" or "1" is represented by the amount of current flowing through the transmission line.

In one embodiment of the invention, three or more different logical levels of the signal are represented by the amount of current flowing through the transmission line.

According to another aspect of this invention, a signal transmission system for transmitting a signal via a transmission line includes: a current supply section for supplying a current to the transmission line, wherein the current has an amount which varies according to a logical level of the signal and flows in a same direction irrespective of the logical level of the signal; a current control section for allowing the current to flow into the current control section from the transmission line or flow from the current control section to the transmission line irrespective of the amount of the current supplied from the current supply section to the transmission line; and a determination section for determining the logical level of the signal based on the amount of current which has flowed from the transmission line into the current control section or based on the amount of current which has flowed out from the current control section to the transmission line.

In one embodiment of the invention, the current control section includes: a constant current supply section for supplying a constant current; and a difference current compensation section for compensating for a difference current having an amount which represents a difference between the amount of current which has flowed in from or flowed out to the transmission line and an amount of the constant current.

In one embodiment of the invention, the signal transmission system includes a transmitter for transmitting the signal and a receiver for receiving the signal. The current supply section is included in the transmitter. The constant current supply section, the difference current compensation section and the determination section are included in the receiver.

In one embodiment of the invention, the signal transmission system includes a transmitter for transmitting the signal and a receiver for receiving the signal. The current supply section and the constant current supply section are included in the transmitter. The difference current compensation section and the determination section are included in the receiver.

In one embodiment of the invention, the determination section determines the logical level of the signal based on a direction in which the difference current flows.

In one embodiment of the invention, the logical level of the signal "0" or "1" is represented by the amount of current flowing through the transmission line.

In one embodiment of the invention, three or more different logical levels of the signal are represented by the amount of current flowing through the transmission line.

According to still another aspect of this invention, there is provided a receiver for receiving a signal transmitted from a transmitter using a first transmission line and a second transmission line. A current flows through the first transmission line and the second transmission line, wherein the current has an amount which varies according to a logical level of the signal and flows in a same direction irrespective of the logical level of the signal. The receiver includes: a difference current compensation section for compensating for a difference current having an amount which represents a difference between the amount of current flowing through the first transmission line and the amount of current flowing through the second transmission line; and a determination section for determining the logical level of the signal based on the difference current.

In one embodiment of the invention, the logical level of the signal "0" or "1" is represented by the amount of the difference current.

In one embodiment of the invention, three or more different logical levels of the signal are represented by the amount of the difference current.

According to still another aspect of this invention, there is provided a signal transmission system, including a transmitter, a receiver, and a first and second transmission line for connecting the transmitter and the receiver to each other, for transmitting a signal from the transmitter to the receiver using the first transmission line and the second transmission line. The transmitter includes a current supply section for supplying, to the first transmission line, a current having an amount which varies according to a logical level of the signal. The receiver includes a determination section for determining the logical level of the signal based on a difference current having an amount which represents a difference between the amount of current flowing through the first transmission line and the amount of current flowing through the second transmission line. The first transmission line and the second transmission line are formed by folding back a single transmission line.

In one embodiment of the invention, the receiver further includes a difference current compensation section for compensating for the difference current.

In one embodiment of the invention, the logical level of the signal "0" or "1" is represented by the amount of the difference current.

In one embodiment of the invention, three or more different logical levels of the signal are represented by the amount of the difference current.

Functions of the present invention will be described below.

According to the present invention, a current flows in the same direction along a transmission line irrespective of a logical level of the transmitted signal. Thus, it is possible to reduce the change in the signal on the transmission line. This assists in reducing the disturbance in the waveform of the transmitted signal. Moreover, substantially all of a variable amount of current which varies according to the logical level of the transmitted signal is absorbed from or flows out to the transmission line by a current control section. Thus, substantially no signal is reflected at an end of the transmission line. This eliminates the need to provide a terminal resistor on the receiver side of the transmission line.

Where a transmitter for transmitting a signal and a receiver for receiving the signal are remote from each other, the ground potential of the transmitter and that of the receiver are often different from each other. Even when the ground potential of the transmitter is the same as that of the receiver, the power supply potential of the transmitter and the ground potential of the receiver may be different from each other due to a decrease in the power supply potential. Moreover, there are cases where the power supply potential of the transmitter and the power supply potential of the receiver are different from each other, such as when the power supply of the transmitter is a 3.3 V power supply while the power supply of the receiver is a power-saving 1.5 V power supply.

In such cases, a current can flow more easily in one direction than in the opposite direction along the transmission line. This is because a current by nature flows from a higher voltage point toward a lower voltage point. According to the present invention, it is possible to design a signal transmission system such that the direction of the current flow along the transmission line coincides with the direction in which a current can flow more easily.

The present invention provides advantages as described above by employing the structure where a current flows in the same direction along the transmission line irrespective of the logical level of the transmitted signal.

Thus, the invention described herein makes possible the advantages of (1) providing a receiver and a signal transmission system in which a change in a current flowing through a transmission line is reduced; and (2) providing a receiver and a signal transmission system which eliminate a terminal resistor connected to a transmission line.

These and other advantages of the present invention will become apparent to those skilled in the art upon reading and understanding the following detailed description with reference to the accompanying figures.

Figure 2A:
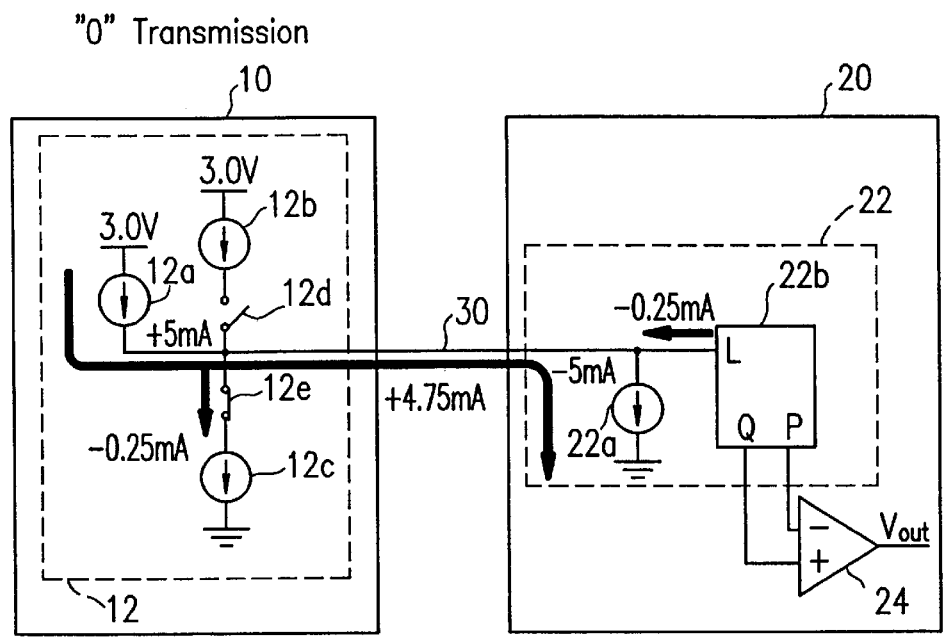
Figure 2B:
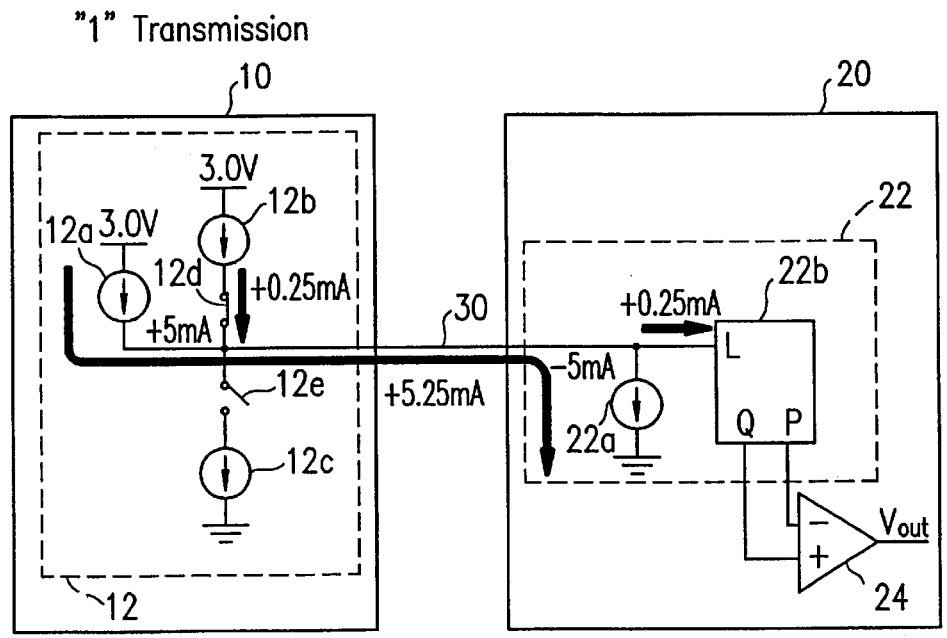
Figure 3A:
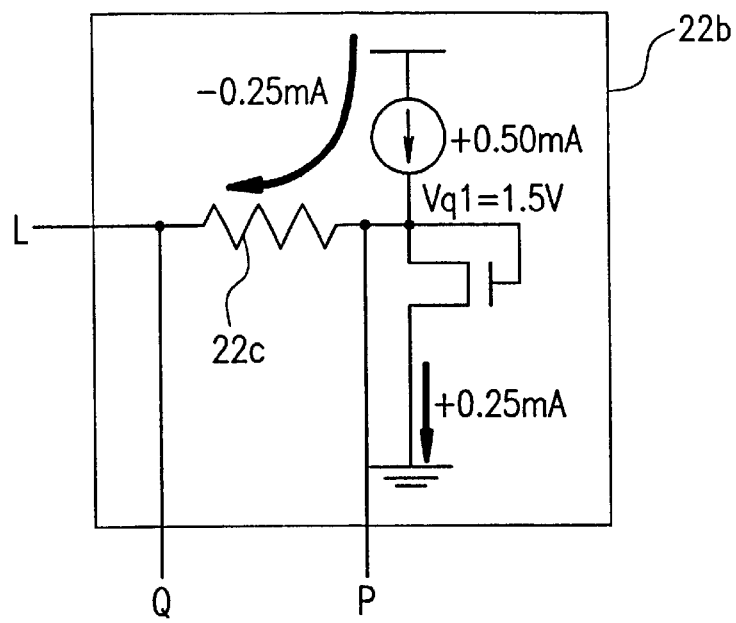
Figure 3B:
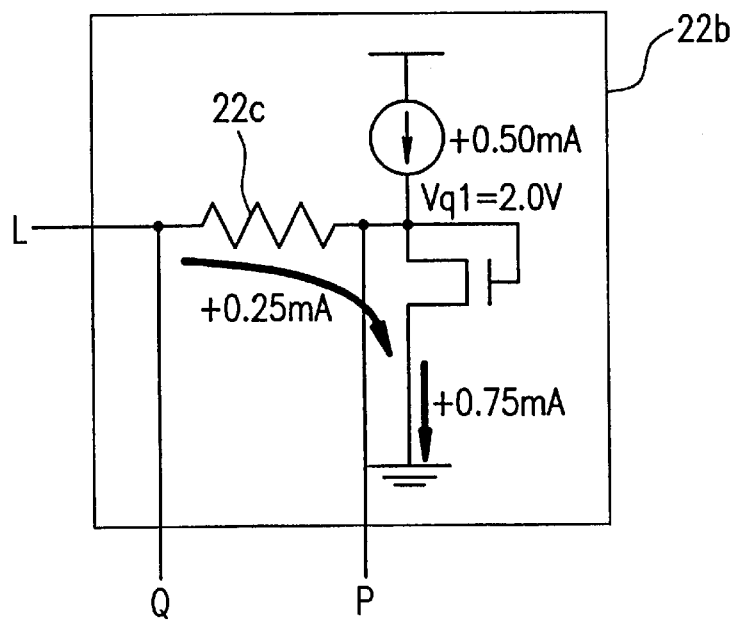
Figure 4:
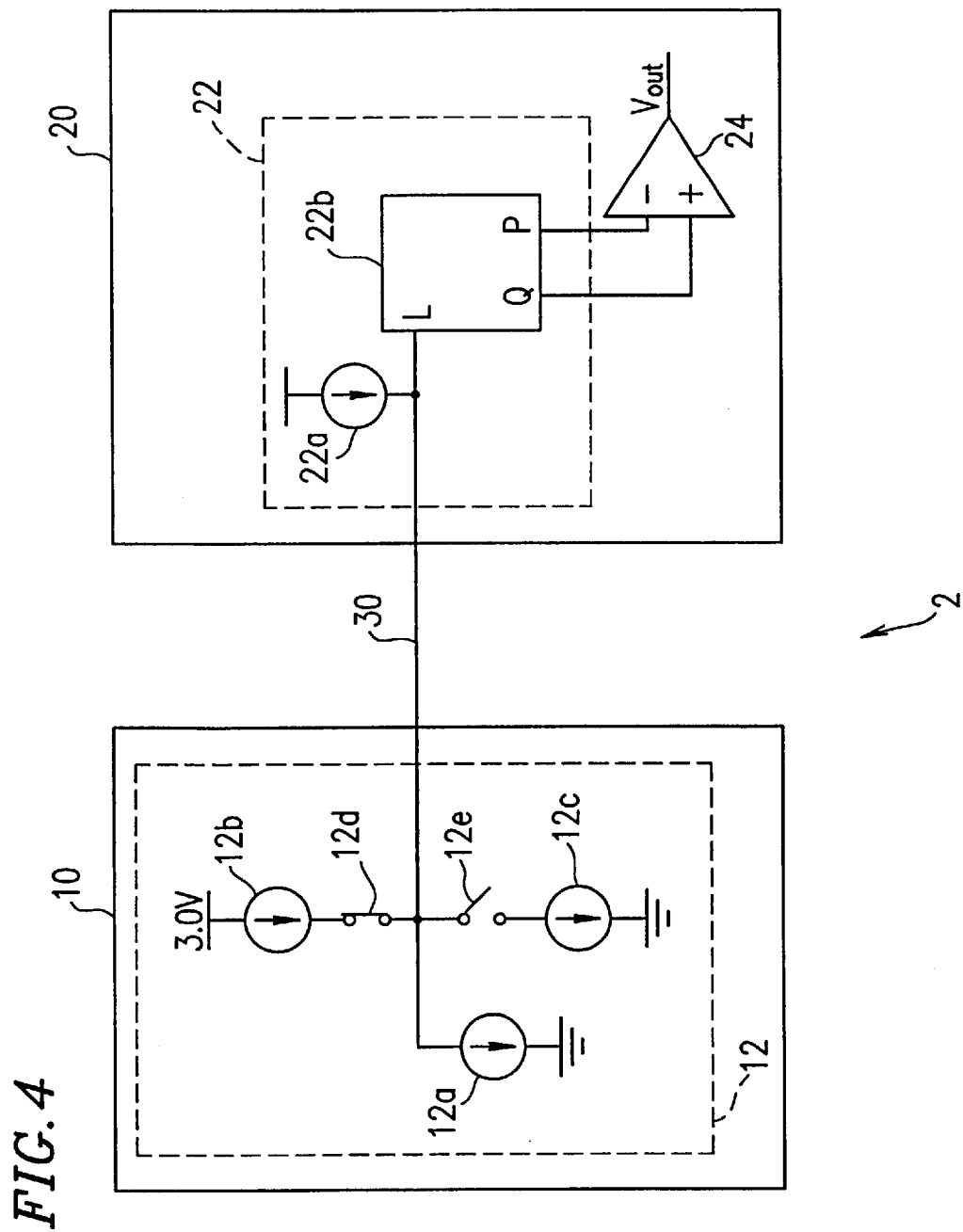
Figure 5A:
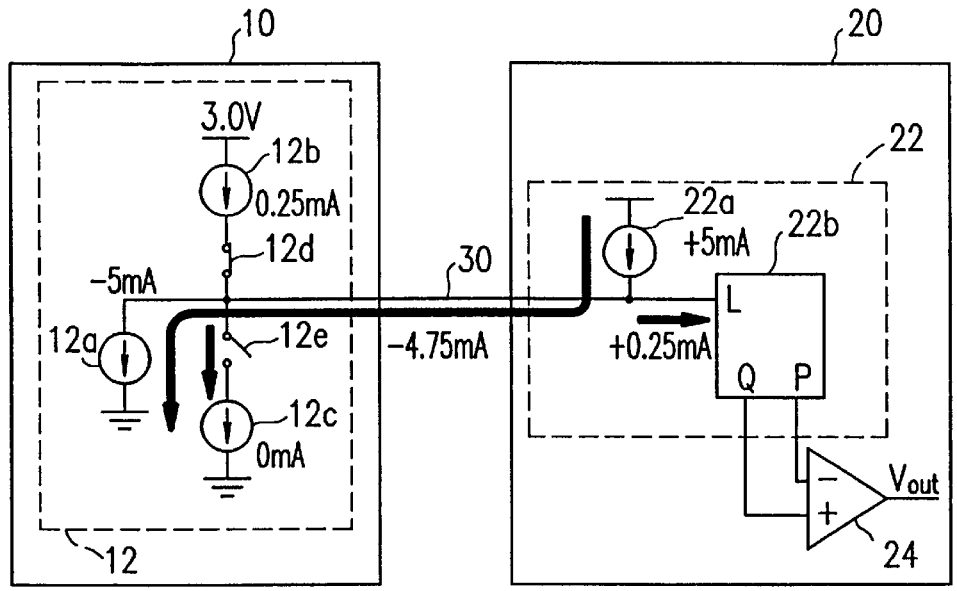
Figure 5B:
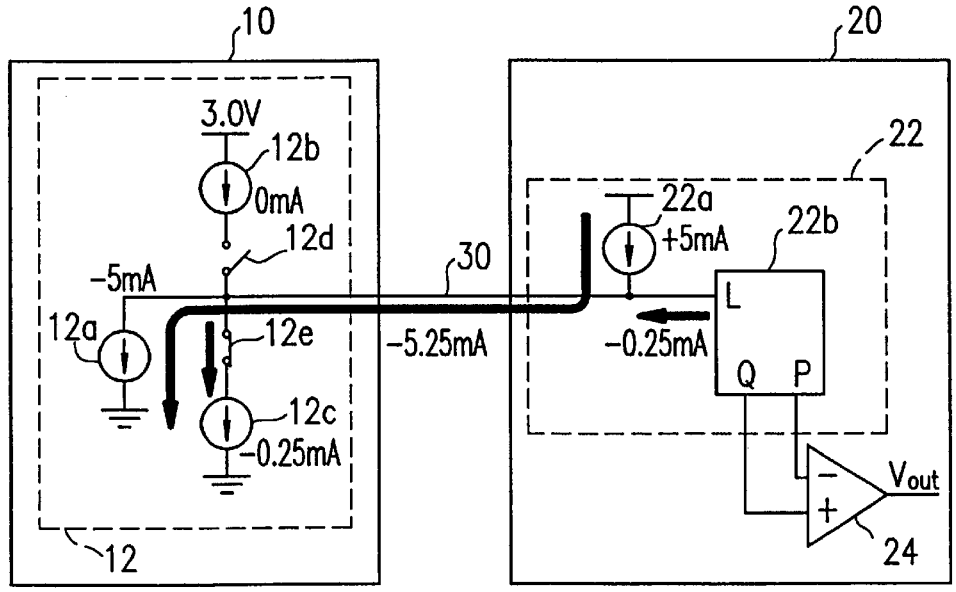
Figure 6:
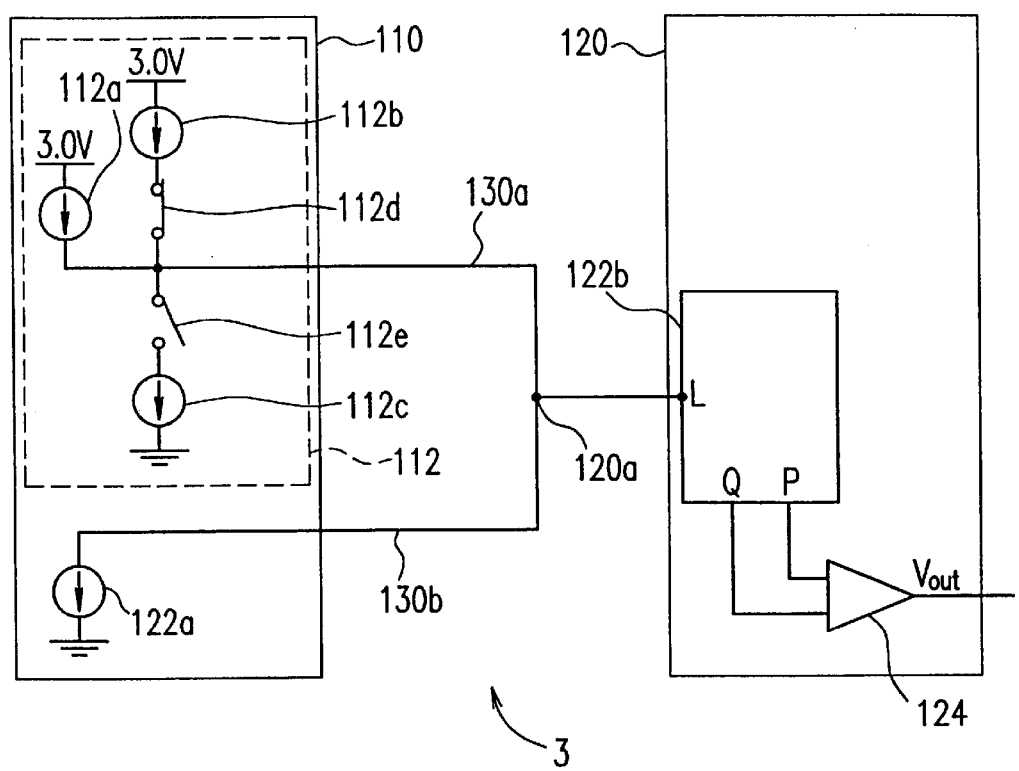
Figure 7A:
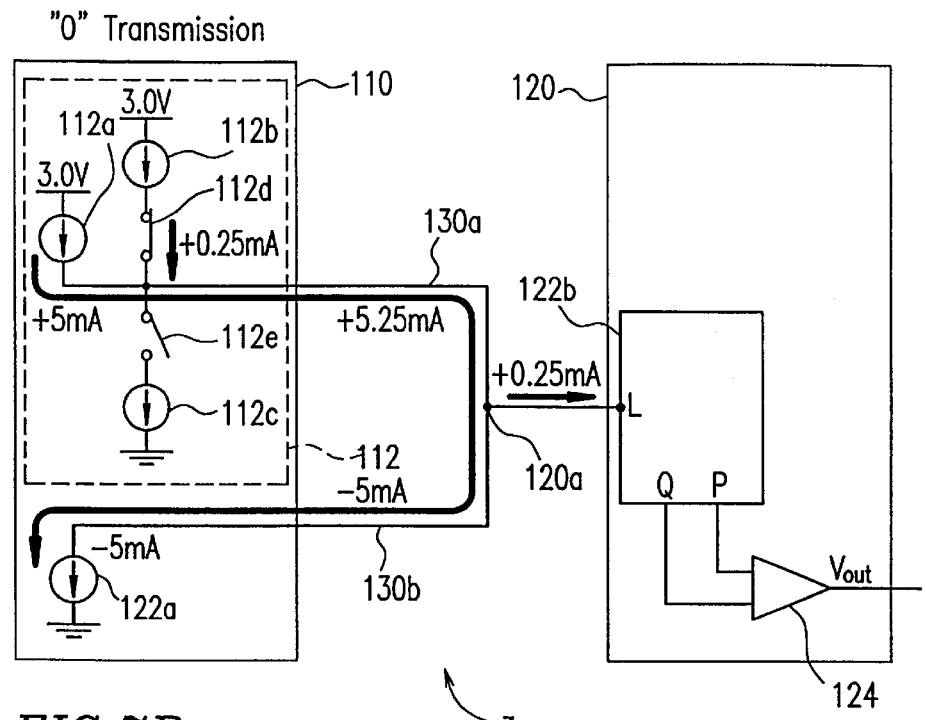
Figure 7B:
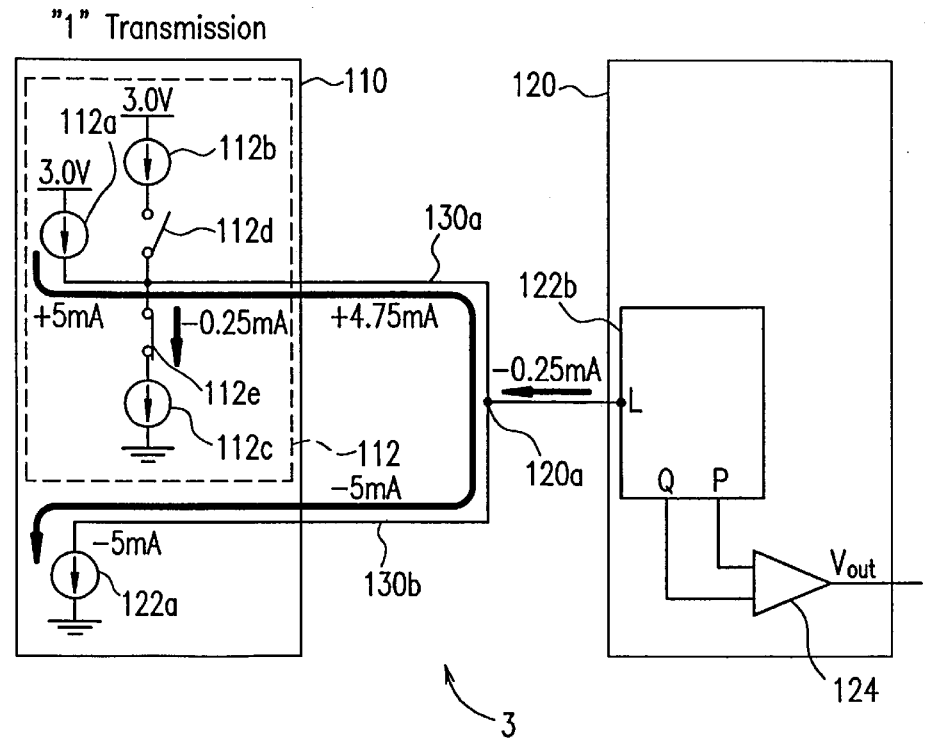
Figure 8:
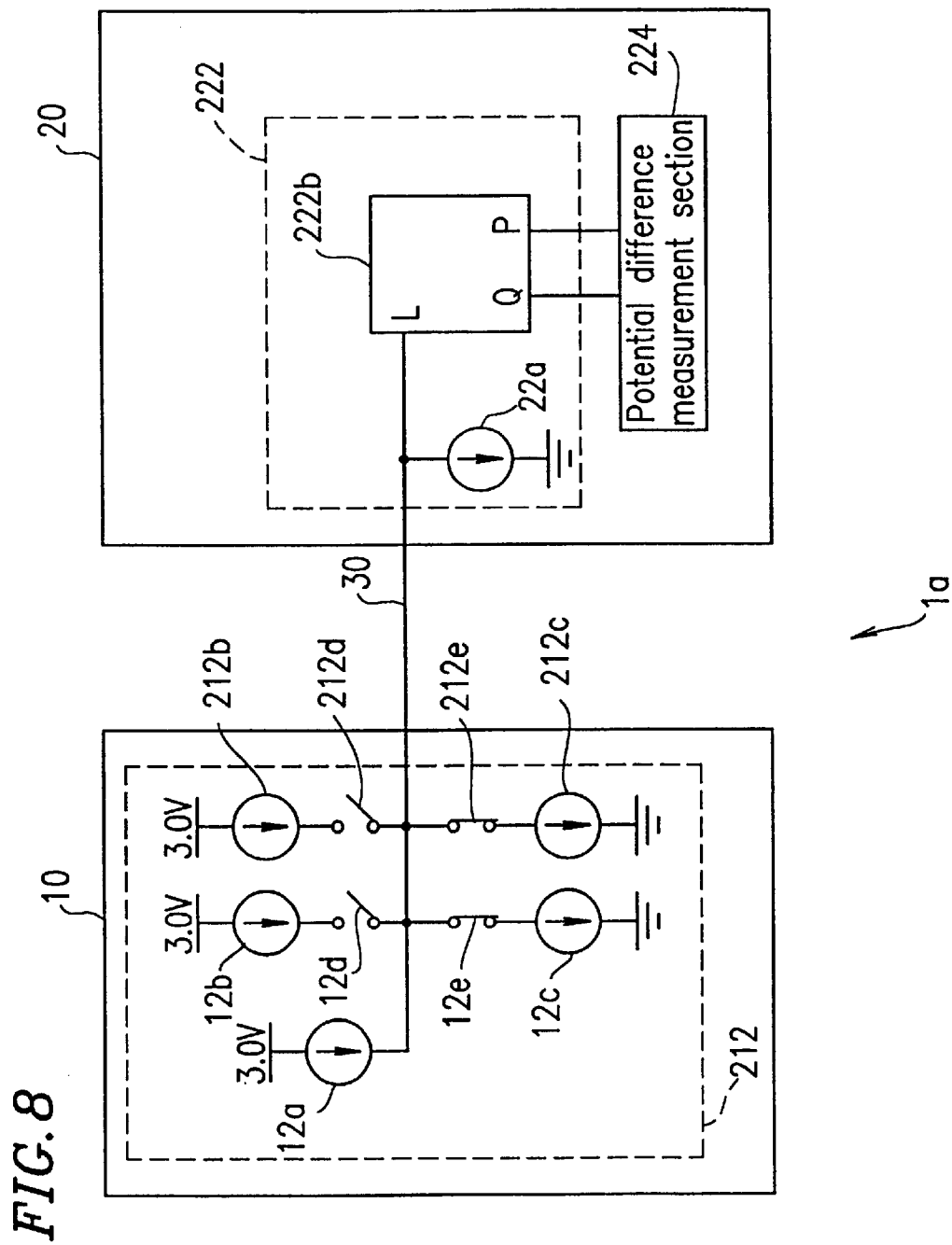

Each of FIGS. 2A and 2B illustrates an operation of the signal transmission system 1;

Each of FIGS. 3A and 3B illustrates an operation of a difference current compensation section 22b;

FIG. 4 illustrates a configuration of a signal transmission system 2 according to Embodiment 2 of the present invention;

Each of FIGS. 5A and 5B illustrates an operation of the signal transmission system 2;

FIG. 6 illustrates a configuration of a signal transmission system 3 according to Embodiment 3 of the present invention;

Each of FIGS. 7A and 7B illustrates an operation of the signal transmission system 3; and FIG. 8 illustrates a configuration of a signal transmission system 1a capable of transmitting a signal having four different logical levels.

DESCRIPTION OF THE PREFERRED EMBODIMENTS

Various embodiments of the present invention will be described below with reference to the accompanying drawings.

Embodiment 1

Figure 1:
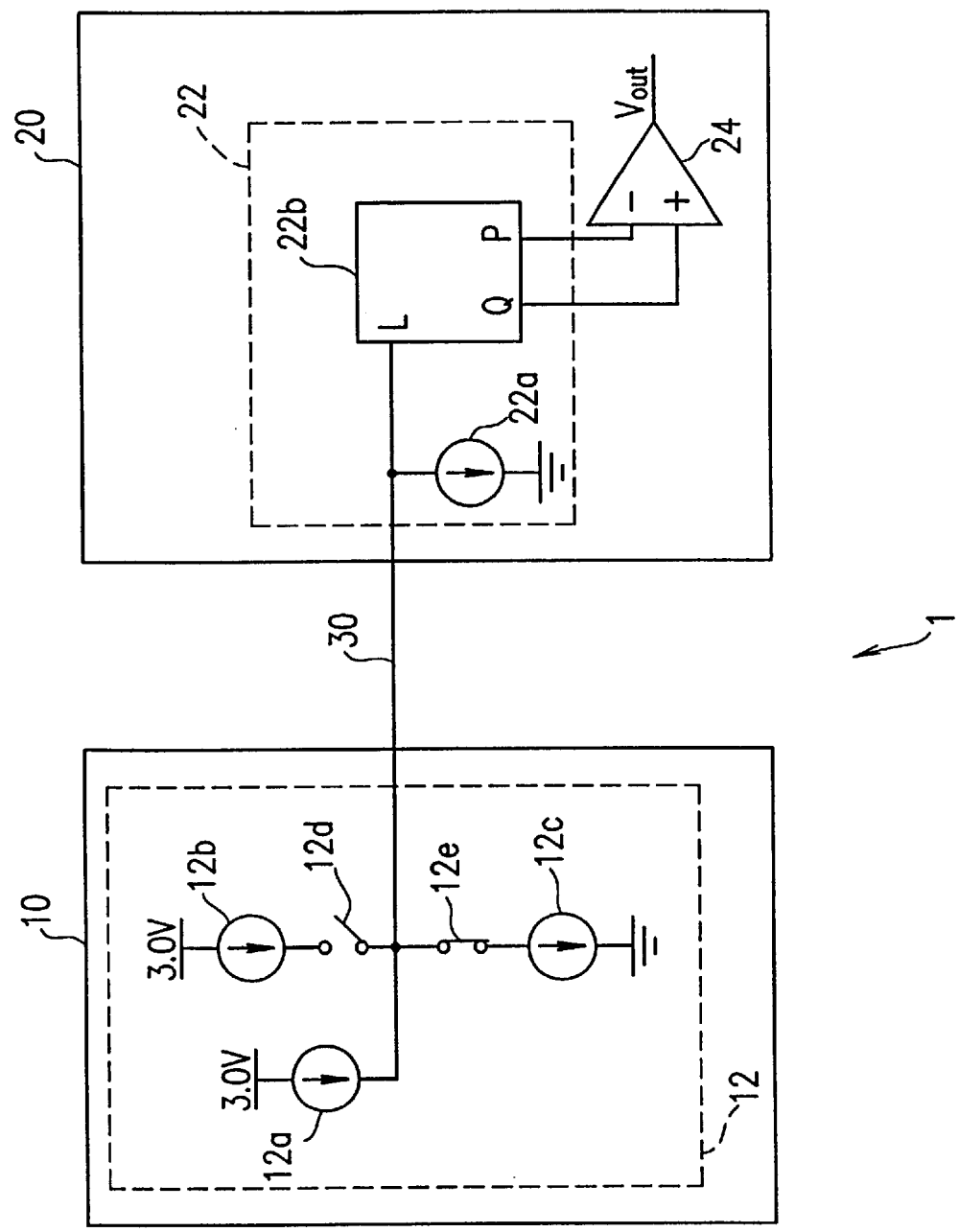
FIG. 1 illustrates a configuration of a signal transmission system 1 according to Embodiment 1 of the present invention.

FIG. 1 illustrates a configuration of a signal transmission system 1 according to Embodiment 1 of the present invention. The signal transmission system 1 includes a transmitter 10, a receiver 20 and a transmission line 30 for connecting the transmitter 10 and the receiver 20 to each other. A signal is transmitted from the transmitter 10 to the receiver 20 via the transmission line 30.

The transmitter 10 includes a current supply section 12 for supplying a current to the transmission line 30.

The current supply section 12 supplies to the transmission line 30 an amount of current which varies according to the logical level of the transmitted signal. For example, when a signal having a logical level "0" is transmitted (i.e., in "0" transmission), the current supply section 12 supplies a current of +4.75 mA through the transmission line 30. When a signal having a logical level "1" is transmitted (i.e., in "1" transmission), the current supply section 12 supplies a current of +5.25 mA through the transmission line 30.

The current supply section 12 supplies a current through the transmission line 30 in the same direction irrespective of the logical level of the transmitted signal. In the example illustrated in FIG. 1, a current flows from the transmitter 10 toward the receiver 20 both in "0" transmission and in "1" transmission.

The current supply section 12 includes a constant current source 12a of 5 mA, another constant current source 12b of 0.25 mA, and still another constant current source 12c of 0.25 mA. One end of the constant current source 12a is connected to a power supply potential, and the other end thereof is connected to the transmission line 30. One end of the constant current source 12b is connected to a power supply potential, and the other end thereof is connected to the transmission line 30 via a switch 12d. One end of constant current source 12c is connected to a ground potential, and the other end thereof is connected to the transmission line 30 via another switch 12e. The switches 12d and 12e are turned ON/OFF by a switch control circuit (not shown). The power supply potential is, for example, 3.0 V. The ground potential is, for example, 0 V.

The receiver 20 includes a current control section 22 and a determination section 24. Irrespective of the amount of current supplied from the current supply section 12 to the transmission line 30, the current control section 22 allows the supplied amount of current to flow there into from the transmission line 30. The determination section 24 determines the logical level of the transmitted signal based on the amount of current which has flowed from the transmission line 30 into the current control section 22.

For example, the current control section 22 absorbs a current of +4.75 mA from the transmission line 30 in "0" transmission, and a current of +5.25 mA from the transmission line 30 in "1" transmission. Thus, the current control section 22 has an ability to always absorb, from the transmission line 30, substantially all of the variable amount of current which varies according to the logical level of the transmitted signal. The determination section 24 determines the logical level of a transmitted signal to be "0" when the amount of current absorbed by the current control section 22 is +4.75 mA, and to be "1" when it is +5.25 mA.

The current control section 22 includes a constant current source 22a of 5 mA and a difference current compensation section 22b for compensating for a difference current which represents the difference between the amount of current flowing through the transmission line 30 and the amount of the constant current flowing through the constant current source 22a. One end of the constant current source 22a is connected to a ground potential, and the other end thereof is connected to the transmission line 30.

Next, an operation of the signal transmission system 1 will be described.

FIG. 2A illustrates an operation of the signal transmission system 1 when a signal having a logical level "0" is transmitted (i.e., in "0" transmission).

In "0" transmission, the switch 12d in the current supply section 12 is turned OFF and the switch 12e in the current supply section 12 is turned ON. Thus, a current of +5 mA flows through the constant current source 12a, and a current of −0.25 mA flows through constant current source 12c. As a result, a current of +4.75 mA flows through the transmission line 30.

A current of −5 mA constantly flows through the constant current source 22a. Therefore, the difference current compensation section 22b compensates for a difference current (−0.25 mA) between the amount of current (+4.75 mA) flowing through the transmission line 30 and the amount of current (−5 mA) flowing through the constant current source 22a. The determination section 24 determines the logical level of the transmitted signal based on the direction of the difference current flow. In the example illustrated in FIG. 2A, the difference current flows in the negative direction (i.e., from the receiver 20 toward the transmitter 10), whereby the logical level of the transmitted signal is determined to be "0".

FIG. 3A illustrates an operation of the difference current compensation section 22b in "0" transmission. The difference current compensation section 22b has a resistor 22c having a resistance of 1 Kohm. The logical level of the transmitted signal is determined based on the direction of the current flow through the resistor 22c. The direction of the current flow through the resistor 22c can be determined by, for example, measuring the voltage between point P and point Q.

FIG. 2B illustrates an operation of the signal transmission system 1 when a signal having a logical level "1" is transmitted (i.e., in "1" transmission).

In "1" transmission, the switch 12d in the current supply section 12 is turned ON and the switch 12e in the current supply section 12 is turned OFF. Thus, a current of +5 mA flows through the constant current source 12a, and a current of +0.25 mA flows through constant current source 12b. As a result, a current of +5.25 mA flows through the transmission line 30.

A current of −5 mA constantly flows through the constant current source 22a. Therefore, the difference current compensation section 22b compensates for a difference current (+0.25 mA) between the amount of current (+5.25 mA) flowing through the transmission line 30 and the amount of current (−5 mA) flowing through the constant current source 22a. The determination section 24 determines the logical level of the transmitted signal based on the direction of the difference current flow. In the example illustrated in FIG. 2B, the difference current flows in the positive direction (i.e., from the transmitter 10 toward the receiver 20), whereby the logical level of the transmitted signal is determined to be "1".

FIG. 3B illustrates an operation of the difference current compensation section 22b in "1" transmission. The difference current compensation section 22b has the resistor 22c having a resistance of 1 Kohm. The logical level of the transmitted signal is determined based on the direction of the current flow through the resistor 22c. The direction of the current flow through the resistor 22c can be determined by, for example, measuring the voltage between point P and point Q.

Thus, according to the signal transmission system 1 of the present invention, it is possible to reduce the change in the signal on the transmission line 30 by conducting a current in the same direction along the transmission line 30 irrespective of the logical level of the transmitted signal. This assists in reducing the disturbance in the waveform of the transmitted signal. Moreover, the current control section 22 always absorbs, from the transmission line 30, substantially all of the, variable amount of current which varies according to the logical level of the transmitted signal. Thus, substantially no signal is reflected at an end of the transmission line 30. This eliminates the need to provide a terminal resistor on the receiver 20 side of the transmission line 30.

Embodiment 2

FIG. 4 illustrates a configuration of a signal transmission system 2 according to Embodiment 2 of the present invention. The configuration of the signal transmission system 2 is substantially the same as that of the signal transmission system 1 except for the connection of the constant current source 12a and the constant current source 22a to the transmission line 30. Elements in FIG. 4 having like reference numerals to those shown in FIG. 1 will not further be described.

As illustrated in FIG. 4, one end of the constant current source 12a is connected to a ground potential, and the other end thereof is connected to the transmission line 30. One end of the constant current source 22a is connected to a power supply potential, and the other end thereof is connected to the transmission line 30.

In the example illustrated in FIG. 4, a current flows from the receiver 20 toward the transmitter 10 irrespective of a logical level of the transmitted signal.

For example, the current control section 22 supplies a current of −4.75 mA to the transmission line 30 in "0" transmission and a current of −5.25 mA to the transmission line 30 in "1". transmission. Thus, the current control section 22 has an ability to always supplies, to the transmission line 30, substantially all of the variable amount of current which varies according to the logical level of the transmitted signal. The determination section 24 determines the logical level of a transmitted signal to be "0" when the amount of current supplied from the current control section 22 is −4.25 mA, and to be "1" when it is −5.25 mA.

Next, an operation of the signal transmission system 2 will be described.

FIG. 5A illustrates an operation of the signal transmission system 2 when a signal having a logical level "0" is transmitted (i.e., in "0" transmission).

In "0" transmission, the switch 12d in the current supply section 12 is turned ON and the switch 12e in the current supply section 12 is turned OFF. Thus, a current of −5 mA flows through the constant current source 12a, and a current of +0.25 mA flows through constant current source 12b. As a result, a current of −4.25 mA flows through the transmission line 30.

A current of +5 mA constantly flows through the constant current source 22a. Therefore, the difference current compensation section 22b compensates for a difference current (+0.25 mA) between the amount of current (−4.75 mA) flowing through the transmission line 30 and the amount of current (+5 mA) flowing through the constant current source 22a. The determination section 24 determines the logical level of the transmitted signal based on the direction of the difference current flow. In the example illustrated in FIG. 5A, the difference current flows in the positive direction (i.e., from the transmitter 10 toward the receiver 20), whereby the logical level of the transmitted signal is determined to be "0".

FIG. 5B illustrates an operation of the signal transmission system 2 when a signal having a logical level "1" is transmitted (i.e., in "1" transmission).

In "1" transmission, the switch 12d in the current supply section 12 is turned OFF and the switch 12e in the current supply section 12 is turned ON. Thus, a current of −5 mA flows through the constant current source 12a, and a current of −0.25 mA flows through constant current source 12c. As a result, a current of −5.25 mA flows through the transmission line 30.

A current of +5 mA constantly flows through the constant current source 22a. Therefore, the difference current compensation section 22b compensates for a difference current (−0.25 mA) between the amount of current (−5.25 mA) flowing through the transmission line 30 and the amount of current (+5 mA) flowing through the constant current source 22a. The determination section 24 determines the logical level of the transmitted signal based on the direction of the difference current flow. In the example illustrated in FIG. 5B, the difference current flows in the negative direction (i.e., from the receiver 20 toward the transmitter 10), whereby the logical level of the transmitted signal is determined to be "1".

The signal transmission system 2 provides substantially the same effects as those provided by the signal transmission system 1.

Embodiment 3

FIG. 6 illustrates a configuration of a differential type signal transmission system 3 according to Embodiment 3 of the present invention. The signal transmission system 3 includes a transmitter 110, a receiver 120, and transmission lines 130a and 130b for connecting the transmitter 110 and the receiver 120 to each other.

The transmission line 130a and the transmission line 130b can be formed by folding back a single transmission line 130. The receiver 120 is connected to the transmission line 130 at a node 120a. A signal is transmitted from the transmitter 110 to the receiver 120 via the transmission lines 130a and 130b.

The transmitter 110 includes a current supply section 112 for supplying a current to the transmission line 130a. The current supplied from the current supply section 112 returns to the transmitter 110 via the transmission line 130a, the node 120a and the transmission line 130b.

The current supply section 112 supplies to the transmission line 130a an amount of current which varies according to the logical level of the transmitted signal. For example, when a signal having a logical level "0" is transmitted (i.e., in "0" transmission), the current supply section 112 supplies a current of +5.25 mA to the transmission line 130a. When a signal having a logical level "1" is transmitted (i.e., in "1" transmission), the current supply section 112 supplies a current of +4.75 mA through the transmission line 130a.

The current supply section 112 supplies a current through the transmission line 130a in the same direction irrespective of the logical level of the transmitted signal. In the example illustrated in FIG. 6, a current flows from the transmitter 110, via the transmission line 130a, the node 120a and the transmission line 130b, and back to the transmitter 110, both in "0" transmission and in "1" transmission.

The current supply section 112 includes a constant current source 112a of 5 mA, another constant current source 112b of 0.25 mA, and still another constant current source 112c of 0.25 mA. One end of the constant current source 112a is connected to a power supply potential, and the other end thereof is connected to the transmission line 130a. One end of the constant current source 112b is connected to a power supply potential, and the other end thereof is connected to the transmission line 130a via a switch 112d. One end of constant current source 112c is connected to a ground potential, and the other end thereof is connected to the transmission line 130a via another switch 112e. The switches 112d and 112e are turned ON/OFF by a switch control circuit (not shown). The power supply potential is, for example, 3.0 V. The ground potential is, for example, 0 V.

The transmitter 110 further includes a constant current source 122a of 5 mA. One end of the constant current source 122a is connected to a ground potential, and the other end thereof is connected to the transmission line 130b. The constant current source 122a can be considered as the constant current source 22a (which is provided on the receiver side in Embodiments 1 and 2) being moved to the transmitter side.

The receiver 120 includes a difference current compensation section 122b for compensating for a difference current which represents the difference between the amount of current flowing through the transmission line 130a and the amount of current flowing through the transmission line 130b, and a determination section 124 for determining the logical level of the transmitted signal based on the difference current. The configuration and the operation of the difference current compensation section 122b are substantially the same as those of the difference current compensation section 22b illustrated in FIGS. 3A and 3B.

Next, an operation of the signal transmission system 3 will be described.

FIG. 7A illustrates an operation of the signal transmission system 3 when a signal having a logical level "0" is transmitted (i.e., in "0" transmission).

In "0" transmission, the switch 112d in the current supply section 112 is turned ON and the switch 112e in the current supply section 112 is turned OFF. Thus, a current of +5 mA flows through the constant current source 112a, and a current of +0.25 mA flows through the constant current source 112b. As a result, a current of +5.25 mA flows through the transmission line 130a.

A current of −5 mA constantly flows through the constant current source 122a. As a result, a current of −5 mA flows through the transmission line 130b. Therefore, the difference current compensation section 122b compensates for a difference current (+0.25 mA) between the amount of current (+5.25 mA) flowing through the transmission line 130a and the amount of current (−5 mA) flowing through the transmission line 130b. The determination section 124 determines the logical level of the transmitted signal based on the direction of the difference current flow. In the example illustrated in FIG. 7A, the difference current flows in the positive direction (i.e., from the node 120a toward the receiver 120), whereby the logical level of the transmitted signal is determined to be "1".

FIG. 7B illustrates an operation of the signal transmission system 3 when a signal having a logical level "1" is transmitted (i.e., in "1" transmission).

In "1" transmission, the switch 112d in the current supply section 112 is turned OFF and the switch 112e in the current supply section 112 is turned ON. Thus, a current of +5 mA flows through the constant current source 112a, and a current of −0.25 mA flows through constant current source 112c. As a result, a current of +4.75 mA flows through the transmission line 130a.

A current of −5 mA constantly flows through the constant current source 122a. As a result, a current of −5 mA flows through the transmission line 130b. Therefore, the difference current compensation section 122b compensates for a difference current (−0.25 mA) between the amount of current (+4.75 mA) flowing through the transmission line 130a and the amount of current (−5 mA) flowing through the transmission line 130b. The determination section 124 determines the logical level of the transmitted signal based on the direction of the difference current flow. In the example illustrated.in FIG. 7B, the difference current flows in the negative direction (i.e., from the receiver 120 toward the node 120a), whereby the logical level of the transmitted signal is determined to be "1".

Thus, according to the signal transmission system 3 of the present invention, it is possible to reduce the change in the signal on the transmission lines 130a and 130b by conducting a current in the same direction along the transmission lines 130a and 130b irrespective of the logical level of the transmitted signal. This assists in reducing the disturbance in the waveform of the transmitted signal. Moreover, the difference between the amount of current flowing through the transmission line 130a and the amount of current flowing through the transmission line 130b is compensated for by the difference current compensation section 122b according to the logical level of the transmitted signal, whereby substantially no signal is reflected at an end of the transmission line 130a or 130b. This eliminates the need to provide a terminal resistor on the receiver 120 side of the transmission line 130a and/or 130b.

Moreover, according to the signal transmission system 3 of the present invention, the transmission line 130a and the transmission line 130b are formed by folding back the single transmission line 130, whereby there is no discontinuity in the medium of the line through which a current flows. On the contrary, according to a conventional signal transmission system, two transmission lines are connected to each other via a terminal resistor. Thus, there can be discontinuity in the medium at the boundary between the transmission line and the terminal resistor, and there can also be discontinuity in solder which is used to connect the transmission line and the terminal resistor to each other. By eliminating such discontinuity in the medium, it is possible to considerably reduce the reflection of a transmitted signal. This is a significant effect provided by the above-described configuration where differential transmission is realized with a single transmission line by folding back the transmission line.

Moreover, the signal transmission system 3 of the present invention eliminates the need to provide a terminal resistor, whereby a current no longer flows through a terminal resistor. This substantially eliminates the voltage amplitude which may occur in the prior art due to the current flowing through the terminal resistor. As a result, there is substantially no leak current occurring at a coupling capacitor formed between adjacent transmission lines. Thus, there is substantially no noise which may be caused by such leak current.

The current supply section 112 may alternatively supply, to the transmission line 130*b*, a current which flows in the same direction irrespective of the logical level of the transmitted signal. For example, the current supply section 112 may supply a current which flows from the transmitter 110, via the transmission line 130*b*, the node 120*a* and the transmission line 130*a*, and back to the transmitter 110, both in "0" transmission and in "1" transmission.

In Embodiment 1 above, the amount of current flowing through the transmission line 30 represents the logical level of the transmitted signal which is either "0" or "1". Alternatively, three or more different logical levels may be represented by the amount of current flowing through the transmission line 30.

For example, the signal transmission system 1 of Embodiment 1 can be modified so that a signal having three or more different logical levels is transmitted from the transmitter 10 to the receiver 20 via the transmission line 30. Also in this case, the logical level of the transmitted signal is represented by the amount of current flowing through the transmission line 30.

FIG. 8 illustrates a configuration of a signal transmission system 1*a* capable of transmitting a signal having four different logical levels. In the signal transmission system 1*a*, a current supply section 212 of the transmitter 10 and a current control section 222 of the receiver 20 are configured so that: a current of +4.50 mA flows through the transmission line 30 when a signal having a logical level "0" is transmitted (i.e., in "0" transmission); a current of +4.75 mA flows through the transmission line 30 when a signal having a logical level "1" is transmitted (i.e., in "1" transmission); a current of +5.25 mA flows through the transmission line 30 when a signal having a logical level "2" is transmitted (i.e., in "2" transmission): and a current of +5.50 mA flows through the transmission line 30 when a signal having a logical level "3" is transmitted (i.e., in "3" transmission).

The current supply section 212 can be obtained by adding constant current sources 212*b* and 212*c* of 0.25 mA and switches 212*d* and 212*e* to the configuration of the current supply section 12 illustrated in FIG. 1 (see FIG. 8). The current control section 222 can be obtained by, for example, replacing the constant current source of +0.50 mA shown in FIGS. 3A and 3B with a constant current source of +0.70 mA. In this case, the logical level of the transmitted signal is determined by measuring the potential difference between point P and point Q in a difference current compensation section 222*b*. A potential difference measurement section 224 is used to measure the potential difference between point P and point Q in the difference current compensation section 222*b*.

Similarly, the signal transmission system 2 of Embodiment 2 can be modified so that a signal having three or more different logical levels is transmitted from the transmitter 10 to the receiver 20 via the transmission line 30. Also in this case, the logical level of the transmitted signal is represented by the amount of current flowing through the transmission line 30. Moreover, the signal transmission system 3 of Embodiment 3 can also be modified so that a signal having three or more different logical levels is transmitted from the transmitter 110 to the receiver 120 via the transmission line 130*a*. In this case, the logical level of the transmitted signal is represented by the difference between the amount of current flowing through the transmission line 130*a* and the amount of current flowing through the transmission line 130*b*.

As described above, the present invention provides a receiver and a signal transmission system in which the change in a current flowing through a transmission line is reduced, and which can eliminate the need to provide a terminal resistor connected to the transmission line.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A receiver for receiving a signal transmitted from a transmitter via a transmission line, the receiver comprising:

a current control section for allowing a current to flow into the current control section from the transmission line or flow from the current control section to the transmission line, wherein the current has an amount which varies according to a logical level of the signal and flows in a same direction irrespective of the logical level of the signal; and a determination section for determining the logical level of the signal based on the amount of current which has flowed from the transmission line into the current control section or based on the amount of current which has flowed out from the current control section to the transmission line.

2. A receiver according to claim 1, wherein the current control section comprises:

a constant current supply section for supplying a constant current; and a difference current compensation section for compensating for a difference current having an amount which represents a difference between the amount of current which has flowed in from or flowed out to the transmission line and an amount of the constant current.

3. A receiver according to claim 2, wherein the determination section determines the logical level of the signal based on a direction in which the difference current flows.

4. A receiver according to claim 1, wherein the logical level of the signal "0" or "1" is represented by the amount of current flowing through the transmission line.

5. A receiver according to claim 1, wherein three or more different logical levels of the signal are represented by the amount of current flowing through the transmission line.

6. A signal transmission system for transmitting a signal via a transmission line, the signal transmission system comprising:

a current supply section for supplying a current to the transmission line, wherein the current has an amount which varies according to a logical level of the signal and flows in a same direction irrespective of the logical level of the signal;

a current control section for allowing the current to flow into the current control section from the transmission line or flow from the current control section to the transmission line irrespective of the amount of the current supplied from the current supply section to the transmission line; and a determination section for determining the logical level of the signal based on the amount of current which has flowed from the transmission line into the current control section or based on the amount of current which has flowed out from the current control section to the transmission line.

7. A signal transmission system according to claim 6, wherein the current control section comprises:

a constant current supply section for supplying a constant current; and a difference current compensation section for compensating for a difference current having an amount which represents a difference between the amount of current which has flowed in from or flowed out to the transmission line and an amount of the constant current.

8. A signal transmission system according to claim 7, wherein:

the signal transmission system comprises a transmitter for transmitting the signal and a receiver for receiving the signal;

the current supply section is included in the transmitter; and the constant current supply section, the difference current compensation section and the determination section are included in the receiver.

9. A signal transmission system according to claim 7, wherein:

the signal transmission system comprises a transmitter for transmitting the signal and a receiver for receiving the signal;

the current supply section and the constant current supply section are included in the transmitter; and the difference current compensation section and the determination section are included in the receiver.

10. A signal transmission system according to claim 7, wherein the determination section determines the logical level of the signal based on a direction in which the difference current flows.

11. A signal transmission system according to claim 6, wherein the logical level of the signal "0" or "1" is represented by the amount of current flowing through the transmission line.

12. A signal transmission system according to claim 6, wherein three or more different logical levels of the signal are represented by the amount of current flowing through the transmission line.

13. A receiver for receiving a signal transmitted from a transmitter using a first transmission line and a second transmission line, wherein:

a current flows through the first transmission line and the second transmission line, wherein the current has an amount which varies according to a logical level of the signal and flows in a same direction irrespective of the logical level of the signal; and the receiver comprises:

a difference current compensation section for compensating for a difference current having an amount which represents a difference between the amount of current flowing through the first transmission line and the amount of current flowing through the second transmission line; and a determination section for determining the logical level of the signal based on the difference current.

14. A receiver according to claim 13, wherein the logical level of the signal "0" or "1" is represented by the amount of the difference current.

15. A receiver according to claim 13, wherein three or more different logical levels of the signal are represented by the amount of the difference current.

16. A signal transmission system, comprising a transmitter, a receiver, and a first and second transmission line for connecting the transmitter and the receiver to each other, for transmitting a signal from the transmitter to the receiver using the first transmission line and the second transmission line, wherein:

the transmitter comprises a current supply section for supplying, to the first transmission line, a current having an amount which varies according to a logical level of the signal;

the receiver comprises a determination section for determining the logical level of the signal based on a difference current having an amount which represents a difference between the amount of current flowing through the first transmission line and the amount of current flowing through the second transmission line; and the first transmission line and the second transmission line are formed by folding back a single transmission line.

17. A signal transmission system according to claim 16, wherein the receiver further comprises a difference current compensation section for compensating for the difference current.

18. A signal transmission system according to claim 16, wherein the logical level of the signal "0" or "1" is represented by the amount of the difference current.

19. A signal transmission system according to claim 16, wherein three or more different logical levels of the signal are represented by the amount of the difference current.

* * * * *